United States Patent [19]

Rowton

[11] Patent Number: 4,721,781
[45] Date of Patent: Jan. 26, 1988

[54] METHOD FOR LOWERING REDUCING SUGAR CONTENT OF GLYCOSIDE COMPOSITIONS

[75] Inventor: Richard L. Rowton, Austin, Tex.

[73] Assignee: ARCO Chemical Company, Newtown Square, Pa.

[21] Appl. No.: 571,768

[22] Filed: Jan. 18, 1984

[51] Int. Cl.$^4$ ................................................ C07H 1/00
[52] U.S. Cl. ...................................... 536/4.1; 536/120; 536/124
[58] Field of Search .......................... 536/4.1, 120, 124

[56] References Cited

U.S. PATENT DOCUMENTS

| 3,721,633 | 3/1973 | Ranauto | 536/4.1 |
| 3,751,409 | 8/1973 | Lee | 536/4.1 |
| 3,772,269 | 11/1973 | Len | 536/4.1 |
| 4,166,172 | 8/1979 | Klein | 536/120 |
| 4,284,763 | 8/1981 | Thelwall et al. | 536/4.1 |
| 4,380,502 | 4/1983 | Muller et al. | 536/120 |
| 4,385,173 | 5/1983 | Dix et al. | 536/120 |

Primary Examiner—J. R. Brown

[57] ABSTRACT

A method for lowering the reducing sugar content of glycoside compositions by adding 1 to 10 wt. % of an orthoformic ester or an acetal of a low-boiling ketone is described. Reducing sugar contents can be lowered from 1 to 3 wt. % to 0.05 to 0.3 wt. % using compounds such as trimethyl orthoformate, triethyl orthoformate and 2,2-dimethoxypropane. Glycoside compositions particularly useful in this method are those formed by the catalytic reaction of starch hydrolysates with low molecular weight polyols. Such glycoside compositions are useful to make high molecular weight polyols having low color suitable for incorporation into polyurethane foams.

7 Claims, No Drawings

METHOD FOR LOWERING REDUCING SUGAR CONTENT OF GLYCOSIDE COMPOSITIONS

BACKGROUND OF THE INVENTION

1. Field of the Invention

The invention relates to the production of glycoside compositions by reacting starch hydrolysates with glycols and triols in the presence of strong acid catalysts and more particularly relates to such glycoside compositions which are subsequently treated to lower their reducing sugar content.

2. Other Methods in the Field of the Invention

Carbohydrate-based polyols derived from starch are well known. It is also established that such polyols are useful in the preparation of polyurethane foams as seen in U.S. Pat. No. 3,073,788.

A reducing sugar, such as the simple aldose or glycose sugars, exists primarily in a cyclic hemiacetal form. In the presence of acid catalysts, hemiacetals react with alcohols to give acetals.

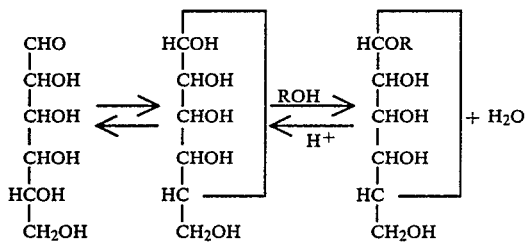

The expression ROH may be a simple alcohol, a glycol, or even another carbohydrate unit. Since polysaccharides such as starch are made up of acetal-linked monosaccharide units, their acid-catalyzed hydrolysis or transglycosidations are also represented by the chemistry expressed in the above equation.

U.S. Pat. No. 3,165,508 to Otey, et al. teaches that degraded starch glycoside polyoxyalkylene ether compositions, useful for reaction with organic diisocyanates, are prepared by reacting unmodified starch with polyols such as ethylene glycol, propylene glycol or glycerol under specific temperature conditions in the presence of a strong mineral acid, followed by etherification with a 1,2-alkylene oxide. Fuzesi suggests introducing the 1,2-alkylene oxide into the reaction mixture of the starch, polyhydric alcohol and acid according to U.S. Pat. No. 3,277,213.

Polyols have also been made from reducing sugars directly by addition of the sugars to an alkylene oxide in the presence of a base as disclosed by Molotsky in U.S. Pat. No. 3,600,338. Unfortunately, the reducing sugars present are sensitive to alkaline catalysts and undergo a variety of condensation and degradation reactions, some of which produce undesirable color. Glycol ethers have also been used to react with cornstarch in a transglycosylation (similar to a transesterification, etc.). Again, the resulting intermediate is alkoxylated to give a starch-based polyol useful in making polyurethanes according to U.S. Pat. No. 3,721,665 to Moss, et al.

U.S. Pat. No. 3,772,269 to Lew teaches glycoside compositions prepared from the reaction of starch hydrolysates, monosaccharides or polysaccharides, with monoalcohols and alkylene glycols of 3 to 5 carbon atoms over an acid catalyst. The ultimate glycoside compositions are useful as detergents, gelling agents, lubricants, wetting agents, dyeing assistants, textile softeners and food emulsifiers.

The orthoformic esters found to be useful in the invention herein are known to function in at least four different ways in the presence of reducing sugars, alcohols or glycols, water and acid catalysts.

First, orthoformic esters may function as water scavengers as taught by G. Kesslin and R. Bradshaw in "Ortho Esters as Water Scavengers," *I & EC Product Research and Development*, Vol. 5, No. 1, 1966, pp. 27–29 according to the following scheme

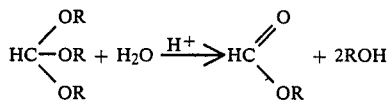

The ester may also react with the free aldehyde to form an acetal, a common technique in protecting aldehyde groups. The following scheme suggested by J. F. W. McOmie in *Protective Groups in Organic Chemistry*, Plenum Press, London, 1973, pp. 327–328 may be postulated

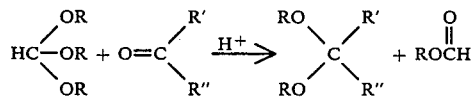

Further, the ester could conceivably react with the hemiacetal in a reaction such as

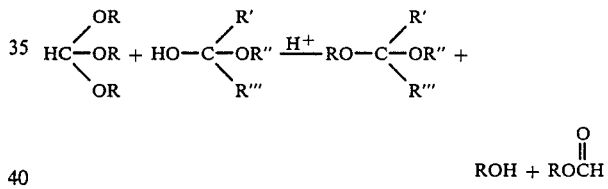

Finally, the ester could exchange with excess alcohol or glycol.

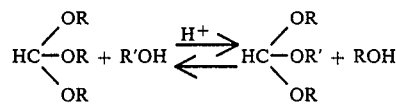

In all of the formulas given previously R, R', R" and R'" simply stand for different alkyl groups.

Reactions of carbohydrates with 2,2-dimethoxypropane to give various products have been performed subsequent to my invention. For example, M. Kiso, et al. in *Carbohydrate Research*, 1976, Vol. 52(1), pp. 87–101 disclose the reaction of 2,2-dimethoxypropane with compounds such as D-glucose, D-xylose, D-arabinose and D-ribose to give a wide variety of products, see Chemical Abstracts 86: 140362v, 1977. Acetals such as 4-O-(3,4-O-isopropylidene-β-D-galactopyranosyl)-2,3=5,6-di-O-isopropylidene-1,1-di-O-methyl-D-glucose may be made by reacting together compounds such as lactose, p—CH$_3$C$_6$H$_4$—SO$_3$H and 2,2-dimethoxypropane by exchange acetalation according to L. Thelwall, et al. in European Pat. No. 17,397 as noted in Chemical Abstracts 94: 121877r, 1981. The reaction of maltose with 2,2-dimethoxypropane can give 1,2-O-isopropylidene-α-maltose, 4-O-α-D- glucopyranosyl-2,3=5,6-di-O-isopropylidene-D-glucose aldehydrol and 1,2=4',6'-di-O-isopropylidene-α-maltose as taught by Y. Ueno, et al. in *Carbohydrate Research*, 1981, Vol. 89(2), pp. 271–278 as found in Chemical Abstracts 95: 25433t, 1981.

There is still a need for a method of lowering the proportion of reducing sugars in various glycoside compositions so that the eventual polyol and polyisocyanate are as free from color as possible.

SUMMARY OF THE INVENTION

The invention concerns a method for lowering the proportion of reducing sugars in a glycoside composition. Ortho-formic esters or acetals of low boiling ketones are added to and reacted with the glycoside composition.

DETAILED DESCRIPTION OF THE PREFERRED EMBODIMENTS

Starch hydrolysates, and corn syrups in particular, are preferred to starch itself as starting materials for polyol initiators because they are fluid at ambient temperatures, and can be pumped and metered. Solids are much more difficult to work with on a large scale than liquids. The same observation can be made for sucrose (a non-reducing disaccharide) as opposed to corn syrup, although sucrose can now be purchased as an aqueous solution. While sucrose has served as a polyol source for many years, it is much more subject to wide price fluctuations than is corn syrup and will probably always be more expensive As a polyol source, or polyol initiator, reducing sugars such as those found in corn syrup have one drawback. They are sensitive to alkaline catalysts the same as any aldehyde, undergoing a variety of condensation and degradation reactions. Since polyols are generally made by the base-catalyzed reaction of alkylene oxides with an initiator, the reducing sugars in corn syrup must be very nearly eliminated if polyols free of by-products and of good color are to be produced.

Acetalization of glycosides is a good way to lower the carbonyl content of a reducing sugar and in some cases can be carried out by using simple volatile alcohols such as methanol. Thus, methyl-α-D-glucoside is made commercially by treating dry dextrose with a large excess of methanol in the presence of acid ion exchange resins. This technique could not be used with corn syrup because of the water present. Higher alcohols could be used, especially those above ethanol, where water would be more easily removed.

Acetalization of corn syrups with simple alcohols has at least three drawbacks. First, there are technical complications in regard to removal of water and excess alcohol. Secondly, the product would be an intractable solid since excess monoalcohol would have to be removed. If the monoalcohols remained in the composition they would lead to chain-terminating alkoxylates. Finally, the number of active hydrogens per molecule is reduced, which is undesirable as far as rigid foam polyols are concerned.

By using an excess of diols or even triols instead of simple alcohols for acetalization, it was found that it is possible to make tractable polyol initiators from corn syrup without having to recycle or otherwise remove the excess reactant. A monoalcohol, such as used by Lew in U.S. Pat. No. 3,772,269 discussed earlier, is not necessary to produce suitable polyol initiators. Very satisfactory neutral polyols and aminopolyols can be made from the resulting initiators. With the relatively high functionality of the glycoside (an additional active hydrogen is furnished by the hydroxypropyl moiety), the initiator can tolerate an excess of diol without adversely affecting the derived polyols and foams.

However, removal of a large excess of diol cannot be used economically to drive the reaction to completion. In fact, it would be preferable to remove no excess glycol at all. At the favored glycol levels and under optimum reaction conditions, it is relatively easy to make a glycoside composition containing from 1 to 3 wt.% reducing sugar (RS). Unfortunatelay, it becomes increasingly difficult to lower the RS proportion further as the value becomes smaller.

We have found that treatment of these glycoside compositions with a relatively small and economically feasible amount of an orthoformic ester or a low-boiling acetal will quickly lower the RS portion from 1–3 wt.% to 0.05–0.25 wt.%. In addition, this treatment gives a product having a better color than would be obtained by prolonged stripping to reduce the RS content to these low levels. This aspect of the invention is particularly surprising.

The method of this invention may be used with any saccharide which contains reducing sugars, regardless of source. The most common source of saccharides are the starches with the formula $(C_6H_{10}O_5)_n$. Typical starches which may be employed include, but are not limited to, potato starch, corn starch, tapioca starch, wheat starch, rice starch, etc. Liquid starch hydrolysates are preferred with corn syrups being especially preferred. Starch hydrolysates may differ from one another in Dextrose Equivalent (DE), total solids, carbohydrate composition, viscosity, etc. The differences mainly reflect differences in the degree of starch hydrolysis. The monosaccharide composition will differ depending on the starch source, with corn being preferred.

Dextrose Equivalent is the percent of reducing sugars in a material, expressed as dextrose, when the material is taken on a dry basis. It may be calculated by the following equation.

$$DE = \frac{(\text{mg reducing sugar as dextrose})(100)}{\text{mg dry substance}}$$

The degree of hydrolysis naturally affects the syrup viscosity drastically, which in turn affects the glycoside preparative process if the viscosity is high enough.

The polyols to be reacted with the saccharides should be of fairly low molecular weight. It is preferred that the polyols be diols and triols having 5 or less carbon atoms. Preferred polyhydric alcohols thus include propylene glycol, ethylene glycol, glycerine, etc. Higher boiling alcohols such as trimethylol ethane, trimethylol propane, diethylene glycol, triethylene glycol, 1,2-butanediol, 1,4-butanediol and more highly functional alcohols could probably also be used. There should be from 0.5 to 1.5 moles of diol or triol for every 100 g of saccharide with from 0.7 to 1.0 moles of diol or triol preferred.

Acids suitable as catalysts for the reaction of saccharides with polyols include strong, non-volatile acids such as sulfuric, methane sulfonic and aryl sulfonic acids, excluding phosphoric acids. The use of p-toluene sulfonic acid is preferred. Strong acid ion exchange resins may also be used. It is suggested that about 0.3 to 1.0 g equivalents of strong acid catalyst per 10 kg of reactants (calculated on a dry basis) be used.

The treatment of the glycoside mixtures resulting from the catalytic reaction of the saccharides with polyols is accomplished with an orthoformic ester or an acetal of a low-boiling ketone. Low-boiling is defined as having a boiling point below about 150° C. Such materials may have the formula

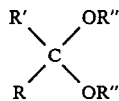

where R is hydrogen or lower alkyl of 1 to 4 carbon atoms, R' is lower alkyl of 1 to 4 carbon atoms or —OR" and R" is lower alkyl of 1 to 4 carbon atoms. Preferred examples of these compounds include trimethyl orthoformate (TMOF), triethyl orthoformate and 2,2-dimethoxypropane. 1,1,3,3-tetramethoxypropane may also be useful in this invention. Approximately 1 to 10 parts of orthoformic ester or acetal of low-boiling ketone should be used per 100 parts of crude glycoside mixture (partially reacted saccharide/diol-triol product). The preferred range of treatment compound is 2 to 4 parts/100 parts.

The preferred temperature range for the entire process, including the reducing sugar proportion lowering step is from about 75° to 125° C. Although the process may be conducted at ambient pressure, the reducing sugar treatment step may also be performed at slightly elevated pressures (up to 100 psig). The vacuum for stripping to obtain a pure product is preferably conducted at about 20 mm Hg. A reaction time of 30 to 220 minutes is possible with about 40 minutes being average.

Generally, the color of the final polyol should be under Gardner 10. The actual color, in and of itself, is not important. However, color is an indication of product quality and consistency. Polyols with a Gardner color of 10 or greater are considered unacceptable.

To make polyols suitable for polyurethanes, the hydroxylated glycosides may be reacted with an alkylene oxide (preferably propylene oxide or ethylene oxide) in processes well known in the art. These alkylene oxides may be added in block or mixed form, with the oxide being added over a period of time. A base catalyst such as NaOH or KOH is frequently used.

The following examples will further illustrate my invention and should not be construed as limiting the scope of my invention.

COMPARATIVE EXAMPLE 1

This example illustrates the preparation of hydroxypropyl glycoside (HPG) composition from corn syrup by means of a conventional stripping technique with p-toluene sulfonic acid (p-TSA) as catalyst.

| Charge | |
|---|---|
| Corn syrup (69 DE, 82.5 solids), g | 300 |
| Propylene glycol, g | 214 |
| p-TSA, g | 4 |

DE stands for dextrose equivalent, the total amount of reducing sugars expressed as dextrose that is present in a corn syrup, calculated as a percentage of the total dry substance.
Procedure The ingredients were charged to a 1 liter, four-necked flask equipped with a stirrer, thermometer, nitrogen bleed and a 12 inch long × ¾ inch diameter air cooled column packed with stainless steel ¼" punched packing. The column was attached to appropriate dry ice cooled traps.

The contents of the flask were heated to 60° C. with stirring and the system was evacuated to 10 mm pressure over a 10 minute period. As water was taken overhead, the pot temperature rose to 90° C. over the next 30 minutes. Vacuum was released and Sample A was taken. Stripping was continued for another 90 minutes and Sample B was taken. Again, stripping was continued at 90° C. and 10 mm pressure for another 90 minutes to give the final highly viscous glycoside composition. The product was gray-green in color by transmitted light and reddish-brown by reflected light. Samples were found to contain the following amounts of residual reducing sugar, expressed in percent dextrose. (Analytical method was adapted from the "Official Methods of Analysis of the Association of Official Agricultural Chemists," 9th Ed., 1960, p. 431).

| Sample | Reaction time, min. | Reducing sugar, % |
|---|---|---|
| A | 40 | 2.8 |
| B | 130 | 0.7 |
| C | 220 | 0.2 |

EXAMPLE 2

This example illustrates the use of an orthoformic ester for quickly and efficiently lowering the reducing sugar in a partially hydroxypropylated corn syrup composition.

Thus, corn syrup, propylene glycol and p-TSA were caused to react substantially as described in Example 1 to a point where the product contained 2.5% reducing sugar (RS). The air cooled column was replaced with a reflux condenser. Four parts of trimethyl orthoformate (TMOF) were added for every 100 parts of glycoside. The mixture was heated at 90° C. for 1 hour at atmospheric pressure. The 12 inch column was put back in place and volatiles were removed under vacuum down to 10 mm over a 10 minute period. The product contained only 0.07% RS.

EXAMPLE 3

Example 2 was repeated but only half as much TMOF was used; i.e., 2 g TMOF/100 g of partially hydroxypropylated corn syrup. The reducing sugar in the product was still quite low—only 0.11%.

EXAMPLE 4

This example illustrates the use of another orthoformic ester and an acetal of a low-boiling ketone. Three parts of each material were used/100 parts of glycoside containing 1.2% RS. Treatment was the same as in Example 2.

| Triethyl orthoformate, RS, % | 0.13 |
|---|---|
| 2,2-dimethoxypropane, RS, % | 0.22 |

EXAMPLE 5

This example represents a 30-fold scale up of Example 2, going from glassware to a 15 gallon kettle.

| Charge | |
|---|---|
| Corn syrup (69 DE, 82.5% solids), lbs | 20.0 |
| Propylene glycol, lbs | 14.3 |
| p-TSA, lbs | 0.26 |
| TMOF, lbs | 0.73 |

Procedure

Syrup, glycol and p-TSA were charged to a nitrogen padded 15 gallon stainless steel steam jacketed kettle equipped with a stirrer, nitrogen inlet and a 1½'×2" diameter stainless steel air cooled column packed with Burrell saddles. Thermocouples were situated to monitor the temperatures in the kettle, in the heating jacket and at the top of the column. The contents of the kettle were heated to 45° C. and vacuum applied to bring the pressure down to 23 mm. With the jacket at 90°–95° C., the kettle temperature rose to 77° C., the top of the column rose to 46° C. and the pressure in the system rose to 70 mm over a 50 minute period as water distilled over. Then the pressure started dropping and the kettle temperature rose over the next 75 minutes to 40 mm and 89° C., respectively.

The jacket temperature was raised to 100°–105° C. which brought the column to 54° C., the kettle to 90° C. and the pressure to 50 mm in 20 minutes. The jacket temperature was cut back to 95° C. In the next 75 minutes the column stabilized at 51° C., the kettle at 90° C., the jacket at 97° C. and the pressure at 20 mm. Nitrogen was bubbled in through the bottom of the kettle to bring the pressure up to 55 mm while the kettle temperature was held at 90° C. Nitrogen purging was continued for 30 minutes. The traps contained 4.9 pounds of overheads, only 0.27 pound of which was high-boiling material, mainly propylene glycol. The column was removed after being allowed to drain. A sample of the contents of the kettle showed a reducing sugar level of 1.2%. The kettle was cooled to 80° C. and TMOF added. The system was pressured to 50 psig with nitrogen and held for one hour at 90° C. The column was put back in place and volatiles were stripped out under vacuum at 90° C. After 20 minutes at 10 mm, the system was purged with nitrogen for 10 minutes. The product was cooled to 65° C. and drained from the kettle.

| Analysis | |
|---|---|
| Reducing sugar, % | 0.11 |
| Hydroxyl number, corrected | 1230 |
| Sodium, ppm | 875 |
| Viscosity, cs, at | |
| 100° F. | 69,000 |
| 140° F. | 4,300 |
| 210° F. | 190 |

EXAMPLE 6

This example illustrates the use of a low DE corn syrup in my invention. A highly viscous 43 DE syrup containing 82.5% solids was used. It was treated substantially as the 69 DE syrup in Example 2, but on a 3 liter scale with the following quantities.

| Charge | |
|---|---|
| Corn syrup, g | 1000 |
| Propylene glycol, g | 714 |
| p-TSA, g | 14 |
| TMOF, g | 35 |

The initial crude product contained 2% RS, while the TMOF treated final product contained only 0.1% RS.

EXAMPLE 7

This example illustrates the use of diols and triols other than propylene glycol.

A. Ethylene Glycol

| Charge | |
|---|---|
| Corn syrup, 69 DE, g | 500 |
| Ethylene glycol, g | 291 |
| p-TSA, g | 7 |
| TMOF, g | 17 |

Again, the procedure was substantially that described in Examples 1 and 2. The RS of the stripped glycoside was higher than usual, 3.6%, but TMOF treatment still reduced the value to a low level, 0.2%. The product was unexpectedly thinner than the hydroxypropyl analog.

B. Glycerine

| Charge | |
|---|---|
| Corn syrup, 69 DE, g | 450 |
| Glycerin, g | 508 |
| p-TSA, g | 6.3 |
| TMOF, g | 16 |

Procedure was the same as just described. RS values were 1.1 and 0.15%, respectively, before and after TMOF treatment.

EXAMPLE 8

The utility of a low RS glycoside composition of my invention as an initiator in the preparation of both amino and neutral polyols is illustrated by this example. The usefulness of the resulting polyols in the preparation of rigid urethane foams is also shown.

A. Aminopolyol

A hydroxypropyl glycoside (HPG) composition was first made substantially as described in Example 5. Its RS content was 0.1%. The HPG was left in the 15 gallon kettle and treated as described below.

| Charge | |
|---|---|
| HPG, lbs | 30.8 |
| Ammonia, anhydrous, lbs | 1.48 |
| Propylene oxide, lbs | 44.4 |
| Ethylene oxide, lbs | 19.4 |

Procedure

The HPG was heated to 50° C. to permit stirring and the kettle was evacuated. Ammonia was added over 10 minutes. Ethylene oxide addition was started at 50° C. as the kettle was heated on up to 125° C. Over 1 hour, 11.7 pounds of ethylene oxide were added. With little delay, propylene oxide addition was started. Over 40 minutes, 35.5 pounds of propylene oxide were added. A mixture of 8.9 pounds of propylene oxide and 5.7 pounds of ethylene oxide was then added over 15 minutes. After a 45 minute digestion period, the remaining 2.0 pounds of ethylene oxide were added. After a 1½ hour digestion period, the product was nitrogen purged for 20 minutes and vacuum stripped for 30 minutes to give the final polyol.

| Analysis | |
|---|---|
| Hydroxyl number | 562 |
| Density | 1.10 |
| Total amine, meq/g | 0.90 |
| Viscosity, cs @ 25° C. | 2430 |
| Gardner color (off-hue brown) | 8 |

Rigid Urethane Foam

A hand mixed rigid foam was made from the above aminopolyol and compared to a foam similarly prepared from a commercial aminopolyol.

| | A | B | | | |
|---|---|---|---|---|---|
| Formulation, pbw | | | | | |
| HPG aminopolyol, Ex. 8 | 34.6 | — | | | |
| THANOL ® R-480[1] | — | 36.5 | | | |
| 33 LV[2] | 0.4 | 0.5 | | | |
| DC-193[3] | 0.5 | 0.5 | | | |
| Freon 11B[4] | 13.0 | 13.0 | | | |
| THANATE ® P-270[5] | 51.3 | 49.5 | | | |
| Isocyanate index | 1.10 | 1.05 | | | |
| Times, sec., | | | | | |
| mixing | 15 | 15 | | | |
| cream | 22 | 38 | | | |
| tack free | 63 | 96 | | | |
| rise | 182 | 200 | | | |
| Foam Properties | | | | | |
| Cell appearance | Fine | Average | | | |
| Initial surface friability | None | None | | | |
| Density, lbs/ft³ [6] | 2.07 | 2.18 | | | |
| Compressive strength, psi, with rise[7] | 42 | 41 | | | |
| Compressive strength, psi, cross rise | 16 | 18 | | | |
| Heat distortion temperature, °C. | 159 | 173 | | | |
| Closed cells, %[8] | 93 | 91 | | | |
| Friability (wt. % loss)[9] | 2.5 | 7.0 | | | |
| Dimensional Stability[10] | ΔV | ΔW | ΔL | ΔV | ΔW | ΔL |
| 158° F., 100% rel. humidity, 1 week | +5.3 | −0.5 | +3.2 | +5.0 | −1.2 | +3.0 |
| 180° F., dry 1 week | +2.3 | −0.7 | +1.3 | +2.4 | −0.6 | +1.4 |
| −20° F. dry 1 week | −1.9 | +0.2 | −1.3 | −1.6 | +0.2 | −1.4 |

[1]An aminopolyol from Texaco Chemical Co., hydroxyl number = 539.
[2]33% solution of triethylenediamine (DABCO) sold by Air Products.
[3]A commercial silicone surfactant from Dow-Corning Corp.
[4]Freon 11B - A commercial fluorocarbon blowing agent from E. I. duPont de Nemours & Co.
[5]THANATE ® P-270 - Texaco Chemical Company's polymethylene-polyphenylisocyanate of 2.7 functionality.
[6]ASTM D-1622
[7]ASTM D-1621
[8]ASTM D-2856
[9]ASTM C-421
[10]ASTM D-2126

B. Neutral HPG Polyol

| Charge | |
|---|---|
| HPG from Example 5, lbs | 8.83 |
| NaOH + water, g | 69 + 70 |
| Propylene oxide, lbs | 20.3 |
| 85% phosphoric acid + water, g | 104 + 315 |
| Dibutyl-para-cresol antioxidant, g | 23 |
| Hyflo-Supercel filter aid, g (made by Johns-Manville) | 250 |

Procedure

The HPG was warmed to 50° C. and charged to a nitrogen padded 15 gallon kettle. The HPG was heated to 60° C. with stirring and the NaOH solution was added. The mixture was heated to 90° C. and oxide addition was started. The temperature was allowed to rise to 125° C. Oxide was added over 100 minutes. After a 1½ hour digestion period, a small amount of unreacted oxide was purged from the system with nitrogen. The temperature of the alkali polyol was adjusted to 90° C. and the phosphoric acid solution, dibutyl-para-cresol and filter aid added. After a 30 minute digestion, water was stripped out by employing full vacuum for 30 minutes at 120° C. and then a nitrogen purge for another 30 minutes. The product was filtered into suitable containers.

| Typical Analysis | |
|---|---|
| Hydroxyl number, corrected | 406 |
| Acid number | 0.19 |
| Viscosity, cs @ 25° C. | 1510 |
| Water, wt. % | 0.03 |
| pH (10/6 isopropanol:water by vol) | 5.2 |
| Gardner color | 5 |
| Sodium, ppm | 207 |

Rigid Foam

A high density foam, commonly used to simulate wood, was made from the above neutral polyol. The foam was molded to make a 1"×12"×16" decorative plaque. Materials were hand mixed in a conventional manner.

| Formulation | pbw |
|---|---|
| Neutral polyol | 46.4 |
| N,N,N',N'—tetramethylpropanediamine | 0.3 |
| DC-193 | 0.5 |
| Water | 0.2 |
| THANATE ® P-270 | 52.6 |
| Index | 1.10 |

COMPARATIVE EXAMPLE 9

This example illustrates the importance of lowering the reducing sugar content of a glycoside composition as much as possible if polyols of the best possible color are to be obtained.

First, an HPG composition was prepared containing 3% RS as described in Example 1. Then a neutral polyol was made from this HPG following the general procedure described in Example 8.

| Analysis | |
|---|---|
| Hydroxyl number, corrected | 433 |
| Acid number | 0.85 |
| pH | 5.0 |
| Viscosity, cs @ 25° C. | 1210 |
| Water, wt. % | 0.14 |
| Gardner color | 18+ |
| Sodium, ppm | 168 |

Note that this product was very dark brown as opposed to the light amber polyol for Example 8.

EXAMPLE 10

The effect of reducing sugars on color development (and whatever composition changes might be associated with darkening) of amine and sodium hydroxide treated glycosides from corn syrup is demonstrated by this example. Color development at this stage would carry over to a derived polyol, but would be less intense because of dilution.

First, an HPG composition was made as described in Example 5. Samples were taken at various times so that a range of reducing sugars would be available. Four samples were taken. From the four, two sets of four were set up. One set was diluted with triethanolamine in the amount of 42 parts TEA per 100 parts HPG. The other set was treated with a solution of 50% NaOH in the amount of 3.5 g/100 parts HPG. All samples were then heated at 120° C. in an oven for 2 hours. Colors of the heat treated samples were compared on the Gardner color scale. In order to get all samples on the scale (18 is the maximum reading), samples containing TEA were diluted with water at the rate of 10 g/30 g of water. Those containing NaOH, being darker because of the very strong base, were diluted at the rate of 10 g/60 g of water.

| Percent Reducing Sugar | Gardner Color With Various Treatments | |
|---|---|---|
| | TEA | NaOH |
| 2.9 | 18 | 18 |
| 1.5 | 13 | 17 |
| 1.1 | 11 | 16 |
| 0.2 | 6 | 6 |

Many modifications may be made in invention by one skilled in the art without departing from the spirit and scope thereof which are defined only in the appended claims. For example, a particular orthoformate ester or acetal of a low-boiling ketone, or certain proportions or reaction parameters may be found to give optimal results. Other monosaccharides such as glycose, aldose, galactose and mannose could also be used with the method of this invention.

I claim:
1. A process for the preparation of glycoside mixtures low in reducing sugars comprising
   a. reacting a starch hydrolysate selected from the group consisting of the hydrolysates of potato starch, corn starch, tapioca starch, wheat starch and rice starch with polyols selected from the group of diols and triols having 5 or less carbon atoms in the presence of an acid catalyst at a temperature in the range from about 75° to 125° C. to give crude glycoside mixtures containing 1 to 3 wt% reducing sugars, and
   b. treating the crude glycoside mixtures from step a. with 1 to 10 wt% of a compound having the formula

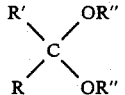

where R is hydrogen or lower alkyl of 1 to 4 carbon atoms, R' is lower alkyl of 1 to 4 carbon atoms or —OR" and where R" is lower alkyl of 1 to 4 carbon atoms, at a temperature in the range from 75° to 125° C. to give glycoside mixtures containing 0.05 to 0.3 wt% reducing sugars.

2. The process of claim 1 in which the number of moles of polyol per 100 g of starch hydrolysate is between 0.5 to 1.5.

3. The process of claim 1 in which the compound used in step b. is selected from the group of compounds consisting of trimethyl orthoformate, triethyl orthoformate and 2,2-dimethoxypropane.

4. The process of claim 1 wherein the starch hydrolysate is the hydrolysate of corn starch.

5. The process of claim 1 in which the acid catalyst is selected from the group consisting of sulfuric acid, methane sulfonic acid, p-toluene sulfonic acid and solid ion exchange resin forms of these acids.

6. The process of claim 1 in which the number of moles of polyol per 100 g of starch hydrolysate is between 0.5 and 1.5.

7. The process of claim 1 in which there are 0.3 to 1.0 gram equivalents of acid catalyst per 10 kilograms of starch hydrolysate and polyol reactants, in the absence of water.

* * * * *